Nov. 18, 1941.  S. MENDELSOHN  2,263,045
SYNCHRONIZER SWITCHING DEVICE
Filed April 21, 1939  2 Sheets-Sheet 1
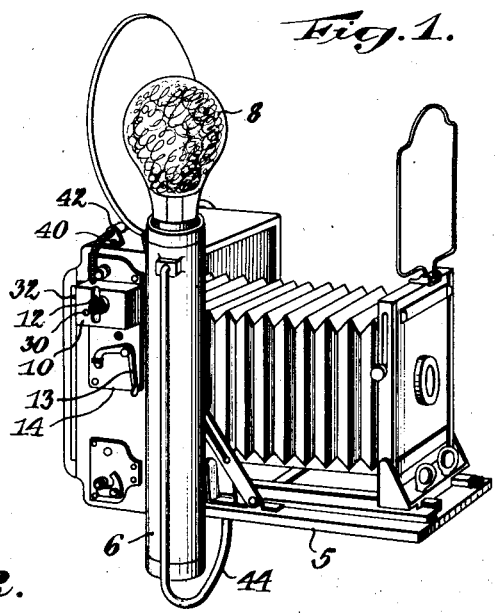
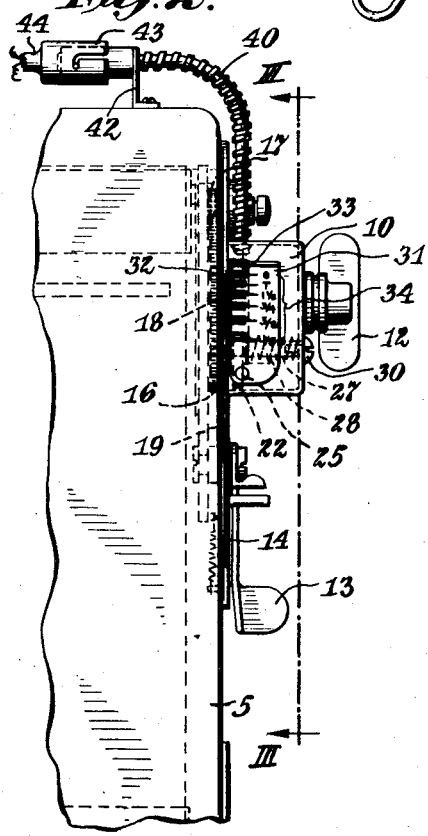
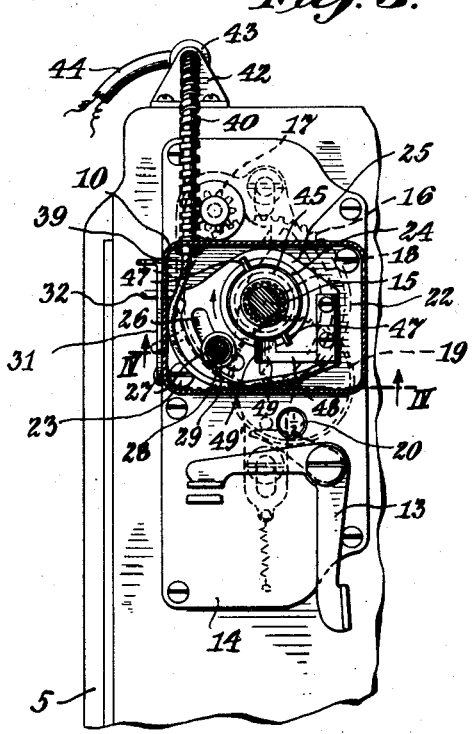
INVENTOR.
S. MENDELSOHN.
BY
ATTORNEY.

Nov. 18, 1941.  S. MENDELSOHN  2,263,045
SYNCHRONIZER SWITCHING DEVICE
Filed April 21, 1939  2 Sheets-Sheet 2
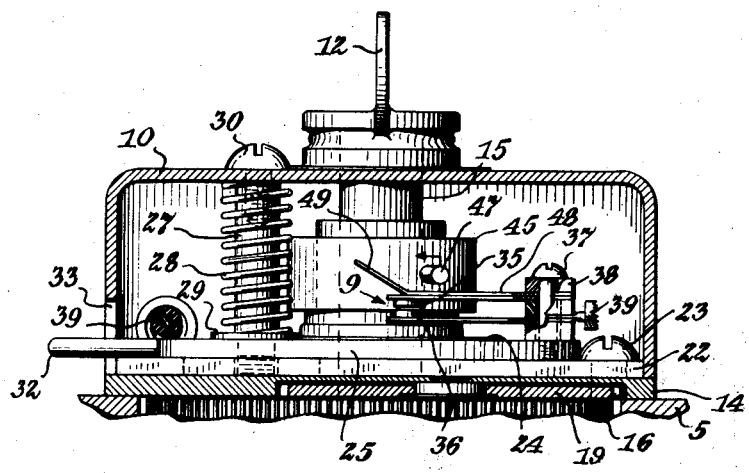
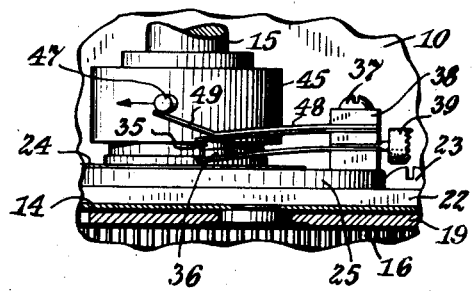
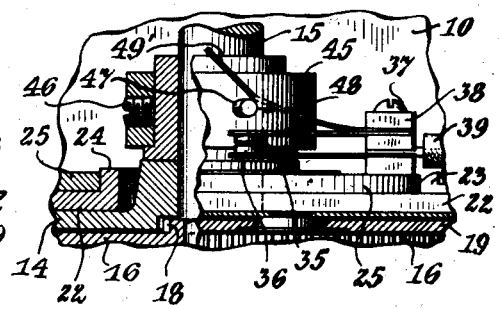
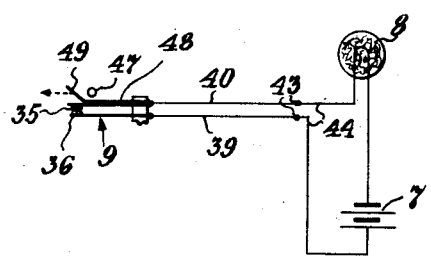
INVENTOR.
S. MENDELSOHN
BY
ATTORNEY.

Patented Nov. 18, 1941

2,263,045

UNITED STATES PATENT OFFICE 2,263,045

SYNCHRONIZER SWITCHING DEVICE

Samuel Mendelsohn, Brooklyn, N. Y.

Application April 21, 1939, Serial No. 269,115

2 Claims. (Cl. 67—29)

The present invention relates to synchronizing apparatus for synchronizing the complete opening of a camera shutter with the moment of peak intensity of a photoflash lamp and has particular reference to such apparatus as employed in conjunction with cameras of the focal plane shutter curtain type.

Various types of synchronizing apparatus are now well known to the art for the purpose of enabling opening of the camera shutter at the precise moment that maximum actinic effect is produced by ignition of a photoflash lamp. This is of extreme importance in the art of photography in order to obtain best results and especially in newspaper photography where it is frequently impossible for "retakes."

In all synchronizing apparatus as employed with cameras of the focal plane shutter curtain type, of which I am aware, such apparatus has been subject to the disadvantageous feature that the shutter curtain must be rewound prior to insertion of the photoflash lamp, otherwise the lamp is inadvertently ignited without the camera being focused or the shutter curtain being properly opened. This accordingly requires the photographer, after having taken one exposure to first rewind the focal plane shutter curtain and then insert the photoflash lamp in its socket.

Since this consumes an appreciable length of time it frequently happens that a photographer in his zeal to take a second exposure whenever possible, forgets the sequence of operation which results in the wasteful ignition of a photoflash lamp and loss of opportunity for a second exposure.

It is accordingly an object of the present invention to provide a synchronizing mechanism for cameras of the focal plane shutter curtain type wherein the photoflash lamp can be ignited only when the focal plane shutter curtain is moving in an exposure taking direction.

Another object of the present invention is the provision of a synchronizing apparatus for cameras of the focal plane shutter curtain type wherein ignition of the photoflash lamp is prevented during setting of the focal plane shutter curtain preparatory to an exposure.

Another object of the present invention is the provision of a synchronizing apparatus which can be readily attached to cameras of the focal plane shutter curtain type, set for various exposure periods in order to insure complete opening of the shutter simultaneously with the moment of peak intensity of a photoflash lamp, and wherein ignition of the photoflash lamp is prevented except during movement of the shutter curtain in an exposure taking direction.

Still further objects of the present invention will become obvious to those skilled in the art by reference to the accompanying drawings, wherein:

Fig. 1 is a perspective view of a camera of the focal plane shutter curtain type showing a synchronizing mechanism constructed in accordance with the present invention attached thereto.

Fig. 2 is a fragmentary elevational view on an enlarged scale of the camera, as shown in Fig. 1, and showing a side view of the synchronizing mechanism of the present invention;

Fig. 3 is a fragmentary elevational view on an enlarged scale of the camera as shown in Fig. 1 and showing the front of the synchronizing mechanism of the present invention with the cover removed and looking in the direction indicated by the arrows III—III of Fig. 2;

Fig. 4 is a sectional view on an enlarged scale, and taken on the line IV—IV of Fig. 3, of the synchronizing mechanisms of the present invention.

Fig. 5 is a fragmentary sectional view of the synchronizing mechanism as shown in Fig. 4 and showing one position of the mechanism during operation;

Fig. 6 is a further fragmentary sectional view of the synchronizing mechanism as shown in Fig. 4 and showing another position of such mechanism during its operation, and Fig. 7 is a schematic diagram of the electrical circuit by which the synchronizing mechanism of the present invention causes ignition of the photoflash lamp.

Referring now to the drawings in detail a camera 5 of the focal plane shutter curtain type is shown in Fig. 1 to which the synchronizing mechanism of the present invention is attached. Such mechanism comprises a battery case 6 which is secured by a suitable bracket or the like (not shown) to the side of the camera. Disposed interiorly of the case are a pair of dry cell batteries 7 (Fig. 7) which serve as the source of electrical energy for a photoflash lamp 8 upon closure of a switch 9 (Figs. 4 and 7) housed within a housing or cover plate 10, as shown in the remaining figures of the drawings.

The camera 5, as above mentioned, is of the focal plane shutter curtain type in which the shutter curtain is provided with several successive openings of different widths. As is well known in the art such camera is so constructed that during exposure, one of these openings flashes across the film simultaneously with movement of a mirror or the like admitting the light and enabling registration of the image on the film. Preparatory to an exposure the shutter curtain is wound by means of a knob 12 connected to the shaft to which the focal plane shutter curtain is secured.

In winding the shutter curtain a spring is tensioned to various degrees for selecting the desired width opening which at a given period of time aligns with the focal plane and lens, thus enabling a comparatively large number of speed combinations.

Inasmuch as the camera itself forms no part of the present invention and its construction and operation is well known in the art, a detailed description thereof is believed unnecessary except in so far as required to adequately describe the present invention. It should suffice to say that the shutter curtain is wound by the knob 12 with attendant tensioning of the usual spring.

The shutter curtain trip mechanism, which is set or "cocked" by movement of a lever 13, is carried on the rear surface of a plate 14, the latter of which is secured to the side of the camera as can be seen in Fig. 1.

By reference more particularly to Figs. 2 to 6 inclusive, it will be seen that the knob 12 is secured to a short shaft 15 extending through the plate 14 and on the rear surface of the latter a gear wheel 16 is secured to this shaft 15 which gear wheel meshes with a small gear or pinion 17 rigidly secured to the shaft upon which the shutter curtain is wound. Thus upon rotation of the knob 12 the gears 16 and 17 are rotated to wind the shutter curtain preparatory to release for an exposure as above noted. At the same time the shaft 15 is rotated other gears 18 and 19, as can be seen in the several figures, are also rotated, but since these are part of the tripping mechanism and among other functions of their operation indicate the time period of exposure, as shown at 20 in Fig. 3, a detailed description thereof is unnecessary.

The synchronizing mechanism forming the subject matter of the present invention and which is connected to the batteries 7 and photoflash lamp 8, as shown in Fig. 7, comprises a plate 22 secured by set screws or the like 23, to the plate 14. Projecting upwardly from this plate 22 is an annular collar 24 having an internal diameter slightly larger than and surrounding a hub integral with the plate for the shaft 15. Surrounding this collar 24 for limited rotary movement thereabout is another plate 25. The plate 25 is excentrically journaled about the collar 24 (see Fig. 3) to provide a slotted arm for the purpose of adjustment as will be described.

In order to hold plate 25 in a selected position about the collar 24 and in frictional engagement with the plate 22, an arcuate slot 26 is provided in the plate 25. Extending upwardly from the plate 22 and through the slot 26 is a post 27 which is provided with a coil spring 28 tensioned between a washer 29 and the cover plate 10 of the mechanism. The plate 10 is held in place by a machine screw or the like 30. A small pin or finger piece 32 projects from the periphery of the plate 25 through a slot 33 provided in one side of the cover plate 10, for the purpose of moving the plate 25 relative to the plate 22 and about the collar 24, within the limits determined by the length of the arcuate slot 26.

As shown in Fig. 2 the cover plate 10 is provided with a pivoted arm 31 adjacent to the slot 33, which arm is provided with slots having graduations 34 corresponding to the same periods of time to which the tripping mechanism is set, as shown at 20, the synchronizing mechanism is synchronized with the tripping mechanism.

Referring now more particularly to Figs. 4, 5, and 6, the plate 25 is shown provided with a pair of normally horizontally disposed spring contact terminals 35 and 36 constituting the switch 9 schematically shown in Fig. 7. These contact terminals are suitably insulated from each other and contact 36 is insulated from the plate 25. The contact terminal 35 is, however, in electrical contact with the plate 25 through the medium of the fastening screw 37 and metallic washer 38 and the spring contact terminal 36 is connected to a conductor 39. As shown in Figs. 2 and 3, in order to facilitate replacement or repair of the synchronizing mechanism it may be completely detached from the camera. For this purpose the conductor 39 extends through a short section of flexible armored cable 40 which is suitably fastened to the plate 22 as by soldering or the like to form a mechanical and electrical bond, and at the top of the camera this armored cable is held in place by a bracket 42. A detachable connector 43 is secured to the end of the armored cable and to which the conductor 39 is also connected so that a two conductor cable 44 may complete the connection to the batteries 7 and photoflash lamp 8.

To cause closure of the spring contact terminals 35 and 36 of the switch 9, the shaft 15 is provided with a collar 45 rigidly secured thereto as by a set screw 46 and having a pair of radially projecting pins 47 spaced 180° apart and so disposed as to engage switch actuating means upon a rotation of the shaft 15. Since these pins must pass the contact terminals when the focal plane shutter curtain is wound by the knob 12, preparatory to the taking of an exposure as well as when the shaft 15 rotates in the opposite direction during an exposure, the photoflash lamp would be ignited in either direction of movement of the shutter curtain in the absence of provisions to the contrary.

For the purpose of preventing an engagement of the contacts in the shutter curtain winding direction while at the same time causing engagement of said contacts in the exposure moving direction of the shutter curtain, a spring member 48 is provided having one end secured in place adjacent the spring contact terminal 35. As shown in Fig. 4 this spring member 48 is normally disposed for the greater portion of its length in parallel relation to the contact terminal 35 and having its free end 49 inclined and provided with an offset lip 49' disposed in the path of movement of pins 47. In the exposure taking position of the camera with the shutter curtain wound to the preselected tension, the pin 47, together with the contact terminals 35 and 36 and the contact member 48, will be in the position shown in Fig. 4.

Upon tripping of the lever 13, the tripping mechanism is set in motion causing rotation of the shaft 15 together with the rigidly connected collar 45. The pin 47 carried by the collar accordingly strikes the spring contact member 48 during its rotation in the direction indicated by the arrow in Fig. 4 which forces the member 48 downwardly carrying with it the spring contact terminal 35. Thus the terminals 35 and 36 engage each other, as shown in Fig. 5, with closure of the circuit and attendant ignition of the photoflash lamp.

Since there is an appreciable time lapse before the desired width slot in the shutter curtain aligns with the lens such time lag is compensated for by adjustment of the tripping mechanism. At the same time there is a time lag between initial energization of the photoflash lamp and the moment of peak intensity which must synchronize with complete alignment of the desired width slot and lens for best results. To properly synchronize these two, the arm 32 is set as before mentioned to the same graduation (Fig. 2) on the pivoted arm 31 as that shown at 20 (Fig. 3) on the camera plate 14. Movement of the arm 32 thus rotates the plate 25 shifting the contact terminals 35 and 36 as well as the member 48 to thus vary the distance which the pins 47 must travel before causing closure of the contact terminals.

Following one exposure the photographer may immediately replace his photoflash lamp 10 and rewind the shutter curtain without danger of inadvertently igniting the lamp. This is due to the fact that as the shaft 15 is rotated by the knob 12 the pins 47 move in the direction indicated by the arrow in Fig. 6. During their movement they will contact the underside of the lip 49' on the inclined terminal 49 of member 48 and lift it, as shown in Fig. 6, and as rotation of the pin 47 continues it will ride off of the lip without causing closure of the contact terminals 35 and 36 even when the engagement of the pin 47 with the member 48 is broken, since the tension of the spring contact 35 is sufficient to resist movement upon impact by the member 48 when the latter is released from engagement with pin 47.

It will thus become obvious to those skilled in the art that a synchronizing mechanism is herein provided which is particularly applicable to cameras of the focal plane shutter curtain type. Moreover, such synchronizing mechanism is readily adjustable so as to condition the mechanism in accurate synchronism with any preselected width opening of the shutter curtain. The synchronizing mechanism is also so constructed as to preclude ignition of a photoflash lamp except during exposure moving direction of the shutter curtain thus eliminating the disadvantageous feature of inadvertently igniting and wasting a photoflash lamp prior to proper focus.

Although one specific embodiment of the present invention has been shown and described it is to be understood that other modifications may be made without departing from the spirit and scope of the appended claims.

What is claimed is:

1. A synchronizing mechanism for cameras of the focal plane shutter curtain type having various width openings therein comprising a shaft for winding and tensioning said shutter curtain to various degrees preparatory to an exposure and to regulate the speed of movement of said shutter curtain to align a preselected width opening with the focal plane after the lapse of a predetermined period of time, tripping mechanism for releasing said shutter curtain and causing rotation of said shaft, a photoflash lamp adapted to be connected to a source of electrical energy to cause ignition thereof, an electric switch provided with a flexible actuator disposed adjacent said shaft and operable during the exposure direction movement of said shutter curtain to connect said photoflash lamp to said source, and a member rotatable with said shaft and engageable with the flexible actuator of said switch in the exposure direction movement of said shutter curtain to cause closure of said switch and also engageable with the flexible actuator of said switch during winding and tensioning of said shutter curtain to avoid closure of said switch and the inadvertent ignition of said photoflash lamp.

2. A synchronizing mechanism for cameras of the focal plane shutter curtain type having various width openings therein comprising a shaft for winding and tensioning said shutter curtain to various degrees preparatory to an exposure and to regulate the speed of movement of said shutter curtain to align a preselected width opening with the focal plane after the lapse of a predetermined period of time, tripping mechanism for releasing said shutter curtain and causing rotation of said shaft, a photoflash lamp adapted to be connected to a source of electrical energy to cause ignition thereof, an electric switch provided with a flexible actuator disposed adjacent said shaft and operable during the exposure direction movement of said shutter curtain to connect said photoflash lamp to said source, a member rotatable with said shaft and engageable with the flexible actuator of said switch in the exposure direction movement of said shutter curtain to cause closure of said switch and also engageable with the flexible actuator of said switch during winding and tensioning of said shutter curtain to avoid closure of said switch and the inadvertent ignition of said photoflash lamp, and a supporting plate for said switch adjacent said shaft and axially adjustable thereabout to vary the distance said rotatable member travels before engaging the actuator of said switch in order to synchronize the moment of peak intensity from said photoflash lamp with alignment of the preselected width opening and said focal plane.

SAMUEL MENDELSOHN.